Feb. 9, 1943.   M. J. HYMAN   2,310,434
COMBINED STRAP AND FASTENER
Filed Jan. 9, 1941
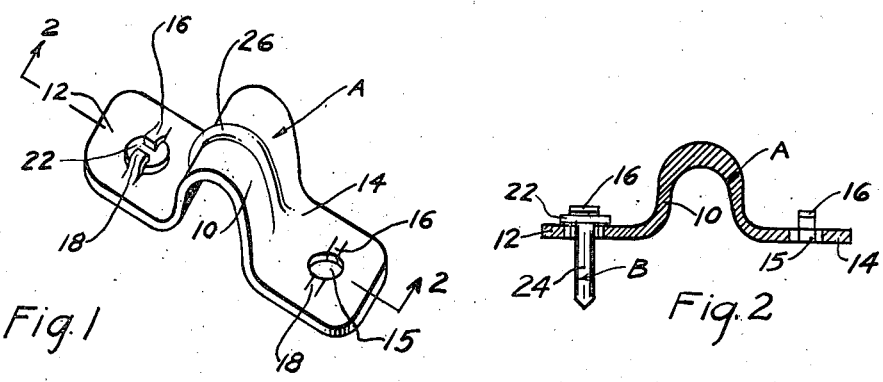
INVENTOR
Morris J. Hyman
BY
Harry Langram
ATTORNEY Patented Feb. 9, 1943

2,310,434

UNITED STATES PATENT OFFICE 2,310,434

COMBINED STRAP AND FASTENER

Morris J. Hyman, Philadelphia, Pa.

Application January 9, 1941, Serial No. 373,826

1 Claim. (Cl. 248—71)

My invention relates to a holding unit and relates particularly to a strap and staple affixed together for the purpose of supporting a cable or pipe.

Heretofore, staples or nails for holding a strap which partially surrounds BX cable or electrical conduit have been employed. The customary strap has a hole in each flange through which the shank of a nail or a screw may be driven. In installing BX cable or pipe, it is frequently necessary to support both the pipe or smaller device and the nail at the same time; in other words, the means heretofore employed in fastening BX cable or conduit to the ceiling required the holding of three items, to wit: (1) the cable or conduit, (2) the strap, (3) the fastener or nail, until the nail or suitable staple was inserted into the wood unless the person doing the installing first strikes the nail or staple properly to simply hold the nail and strap in position. At times, the person driving the nail or staple may hold his finger on the nail prior to driving the nail into the wood; under such circumstances, there is danger of striking the person's finger instead of the nail.

Attempts have been made to use a unitary U-shaped staple and holding strap, such as those used for holding BX cable, but these unitary staples do not have the required configuration while maintaining the required strength for holding the pipe or cable. Therefore, ability to hold a BX cable has been sacrificed for strength of the article itself.

It is an object of my invention to combine a strap with a holding nail wherein the nail is non-removable from the strap.

It is a further object of my invention to combine a staple and nails together wherein the cost of manufacture is not materially increased.

Other objects of my invention are to provide an improved device of the character described, that is easily and economically produced, which is sturdy in construction and which is highly efficient in operation.

With the above and related objects in view, my invention consists in the details of construction and combination of parts, as will be more fully understood from the following description, when read in conjunction with the accompanying drawing, in which:

Fig. 1 is a perspective view of a strap having an opening at one end without the nail or staple therein, and at the left end side is shown the flange coupled means for retaining the head of a nail.

Fig. 2 is an elevational view taken on the line 2—2 of Fig. 1.

Referring now in greater detail to the drawing, I show a retaining strap, generally designated as A, which has a partially encircling or holding member 10 and side flanges 12 and 14, respectively, the encircling member 10 complementing and holding the conduit or BX cable. Each of the side flanges 12, 14 has an opening 15 therein to receive shank 24 of a holding nail or screw, generally designated as B, but the opening 15 is not sufficiently large to enable the head 22 of the screw or nail B to pass therethrough. Radially extending from the center of each of the openings in each flange are a plurality of metal extensions 16 and 18 that impinge or engage against the top of the head 22 of the nail B. The shank 24 of the nail B is shown in Fig. 2.

The strap may be formed of galvanized iron or a composition of material, such as a plastic or "Bakelite" material, consistent with the use to which the improved strap is to be placed, and a suitable bead 26 may be formed upon the arcuate portion of the strap 10 in order to add strength to the strap.

During the course of manufacturing the strap, the projecting arms on members 16 and 18 are formed in a punch press operation and overlap the head of the nail or staple to hold the nail B in position. The strength of the strap is not affected by the stamped-out nail head holding arms 16 and 18.

Although my invention has been described in considerable detail, such description is intended as illustrative rather than limiting, since the invention may be variously embodied, and the scope of the invention is to be determined as claimed.

I claim as my invention:

A BX cable or pipe retaining device comprising a substantially U-shaped strap having outwardly extending flanges, each of said flanges having an opening therein, each of said flanges having a pressed-out extension in said flange leading to said opening, a nail having a head and a shank, said nail shank interfitting with one of sid flange openings, and said pressed-out extension of the flange which terminates at said opening overlapping said nail head whereby said nail cannot slip from the flange opening.

MORRIS J. HYMAN.